United States Patent
Uchiyama et al.

(10) Patent No.: US 8,526,948 B2
(45) Date of Patent: Sep. 3, 2013

(54) BASE STATION APPARATUS AND METHOD

(75) Inventors: Tadashi Uchiyama, Miura (JP);
Kazunori Obata, Yokosuka (JP); Seigo Harano, Yokohama (JP); Shogo Yabuki, Yokosuka (JP); Mikio Iwamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/639,331

(22) PCT Filed: Mar. 29, 2011

(86) PCT No.: PCT/JP2011/057898
§ 371 (c)(1),
(2), (4) Date: Oct. 4, 2012

(87) PCT Pub. No.: WO2011/125676
PCT Pub. Date: Oct. 13, 2011

(65) Prior Publication Data
US 2013/0029679 A1    Jan. 31, 2013

(30) Foreign Application Priority Data

Apr. 5, 2010 (JP) ................................. 2010-087105

(51) Int. Cl.
H04W 4/00 (2009.01)
H04W 36/00 (2009.01)
H04W 72/00 (2009.01)
H04W 68/00 (2009.01)

(52) U.S. Cl.
USPC ........ 455/435.1; 455/442; 455/450; 455/458; 370/216; 370/329

(58) Field of Classification Search
USPC .............. 455/435.1, 442, 450, 458; 370/216, 370/329
See application file for complete search history.

(56) References Cited

U.S. PATENT DOCUMENTS

| | | | |
|---|---|---|---|
| 6,745,031 B2 * | 6/2004 | Chun et al. | 455/435.1 |
| 6,754,498 B2 * | 6/2004 | Chun et al. | 455/442 |
| 6,766,173 B1 * | 7/2004 | Chun et al. | 455/450 |
| 2002/0068572 A1 * | 6/2002 | Chun et al. | 455/442 |

(Continued)

OTHER PUBLICATIONS

International Search Report w/translation issued from PCT/JP2011/057898 mailed Apr. 26, 2011 (2 pages).

(Continued)

*Primary Examiner* — William D Cumming
(74) *Attorney, Agent, or Firm* — Osha Liang LLP

(57) ABSTRACT

A base station apparatus including a reconnection request signal receiving unit configured to receive a reconnection request signal transmitted from a mobile apparatus, the reconnection request signal being for the mobile apparatus requesting reconnection to the base station apparatus, a status detection unit configured to detect whether a status of the mobile apparatus immediately before transmitting the reconnection request signal corresponds to a status where a frequency band measurement period is activated, the frequency band measurement period causing the mobile apparatus to measure a frequency band different from a frequency band for a radio access technology for use in radio communication between the mobile apparatus and the base station apparatus, a response signal generation unit configured to generate a response signal to the reconnection request signal, the response signal generation unit generating, if the status detection unit determines that the frequency band measurement period is activated, the response signal including an indication signal for causing the mobile apparatus to activate the frequency band measurement period and a response signal transmitting unit configured to transmit the generated response signal to the mobile apparatus is disclosed.

8 Claims, 5 Drawing Sheets

(56) References Cited

U.S. PATENT DOCUMENTS

2002/0068586 A1* 6/2002 Chun et al. .................. 455/458
2012/0140728 A1* 6/2012 Nakao et al. ................. 370/329
2012/0182858 A1* 7/2012 Nakao et al. ................. 370/216

OTHER PUBLICATIONS

Written Opinion issued from PCT/JP2011/057898 mailed Apr. 26, 2011 (3 pages).

3GPP TS 36.331 V9.1.0; "3rd Generation Partnership Project; Technical Specification Group Radio Access Network; Evolved Universal Terrestrial Radio Access (E-UTRA) Radio Resource Control (RRC); Protocol specification (Release 9)"; Dec. 2009 (232 pages).

Notice of Rejection Reason w/translation issued in Japanese Application No. 2010-087105 dated Apr. 6, 2012 (3 pages).

* cited by examiner

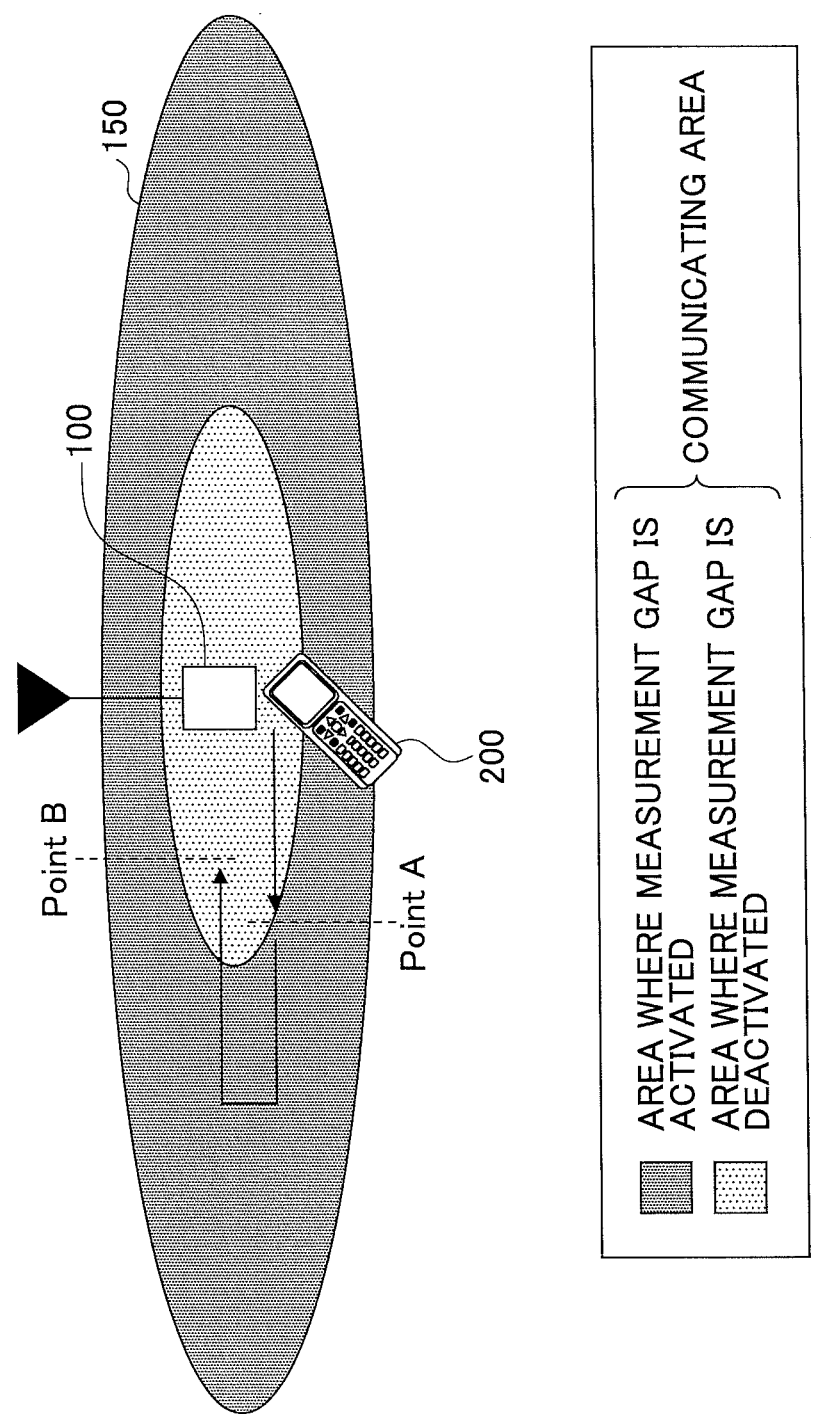

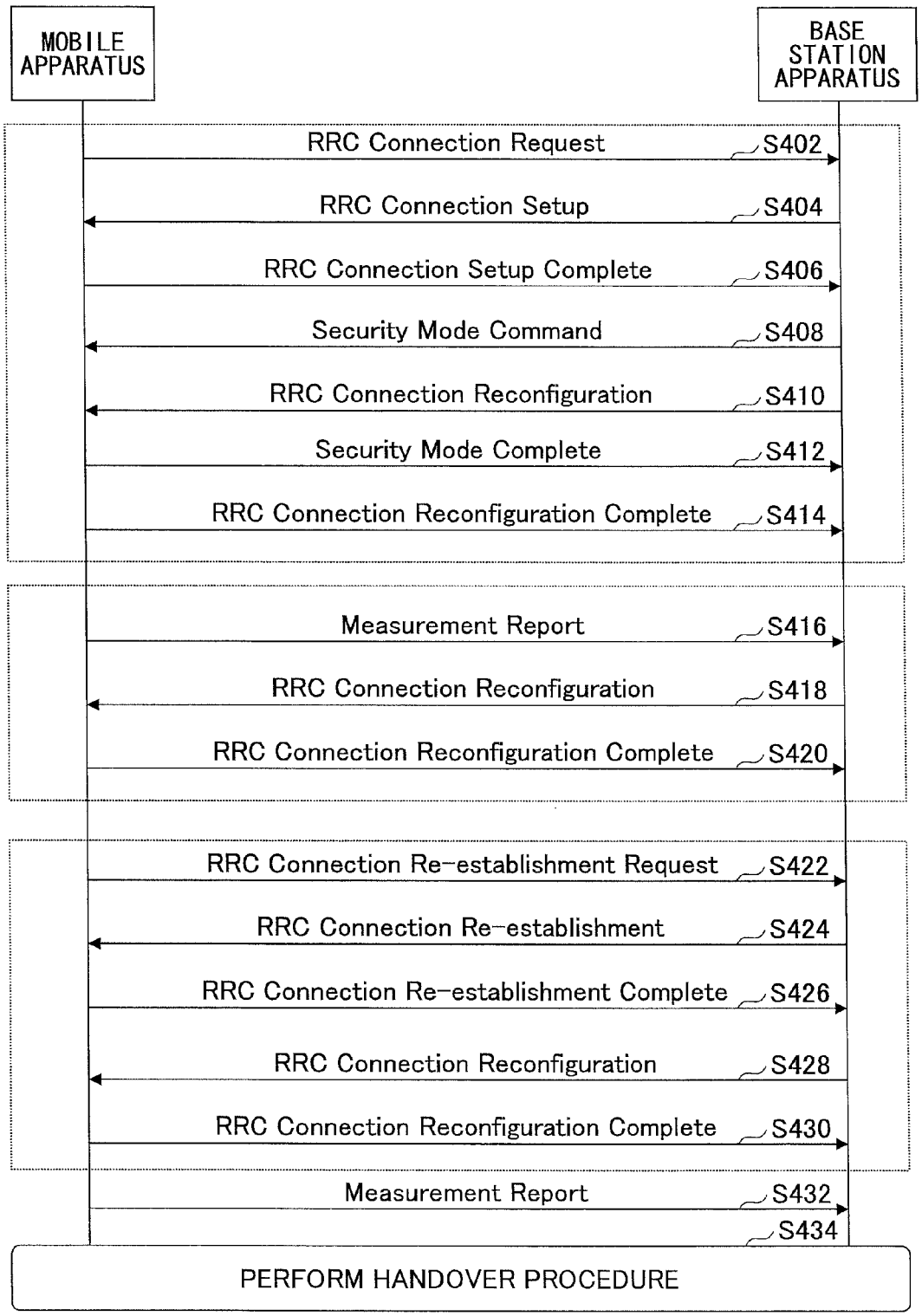

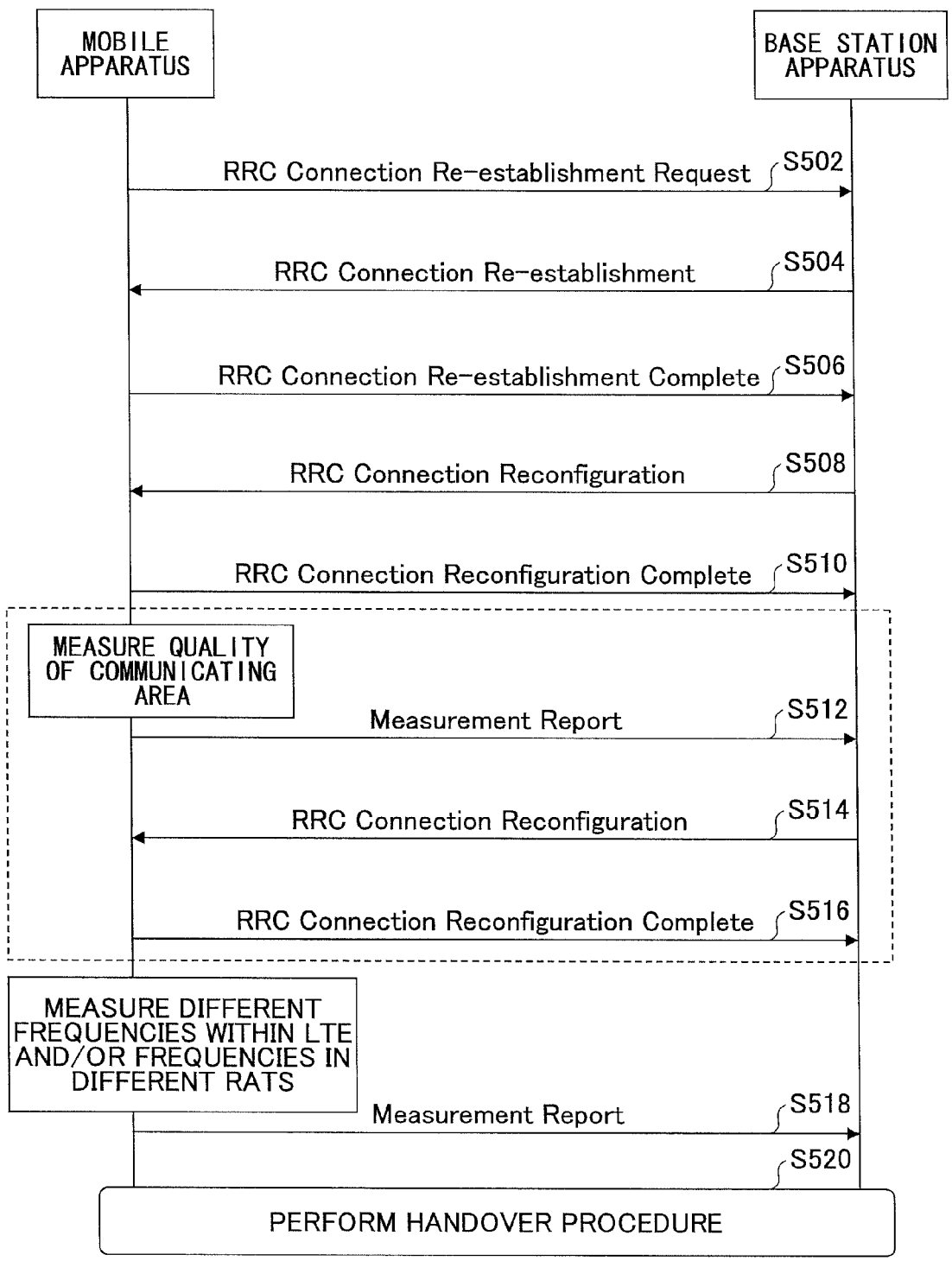

BASE STATION APPARATUS AND METHOD

TECHNICAL FIELD

The present invention relates to radio communication systems.

BACKGROUND ART

Specifications for Long Term Evolution (LTE) are drafted by a Wideband-Code Division Multiple Access (W-CDMA) standardization group $3^{rd}$ Generation Partnership Project (3GPP). The LTE is a standard specification developed from an extended technique High Speed Packet Access (HSPA) of the W-CDMA. In the LTE, high speed communications of higher than 100 Mbps in downlink and higher than 50 Mbps in uplink are realized to achieve delay reduction and frequency utilization.

Subsequent introduction of the LTE may lead to a mixture of existing mobile communication systems and the LTE. Such an existing system may include a W-CDMA based mobile communication system.

In a mobile communication system, a mobile apparatus measures reception level or reception quality of a predefined frequency. The predefined frequency includes a frequency for a serving cell or a frequency different from that for the serving cell. The serving cell may be a cell for the LTE. Also, the predefined frequency may include a frequency for a Radio Access Technology (RAT) different from the LTE. The RAT may include a W-CDMA based mobile communication system. The frequency band for a Radio Access Technology (RAT) different from the LTE may consist of the same frequency band as the LTE or a different frequency band.

If measurements for a frequency band different from the frequency band for the serving cell are performed at a mobile apparatus, a period for measuring the frequency band is configured between a base station apparatus and the mobile apparatus. This period is also referred to as a measurement gap. If there is a likelihood that the mobile apparatus may be caused to conduct handover to the frequency band different from the frequency band for the serving cell, the base station apparatus indicates the mobile apparatus to activate the measurement gap and measure a predefined frequency band. Here, a case where there is a likelihood of causing the mobile apparatus to conduct handover may correspond to the case where communication quality is poor in a present communication area and another base station apparatus is present around the base station apparatus. The base station apparatus determines timings of causing the mobile apparatus to activate or deactivate the measurement gap. In order to determine the timings, the base station apparatus indicates the mobile apparatus to measure communication quality for areas during communications. In the measurement gap, the mobile apparatus measures a frequency band different from a frequency band for a serving cell, and the base station apparatus (eNodeB) does not transmit data to the mobile apparatus. This is because the mobile apparatus cannot transmit and receive any data in the measurement gap.

If the mobile apparatus detects degradation of the communication quality during the activated measurement gap, the mobile apparatus deactivates the measurement gap and requests reconnection to the base station apparatus. The degradation of communication quality may be referred to as "squelch".

When the base station apparatus indicates reconfiguration, such as measured contents, to the mobile apparatus, the base station apparatus may transmit difference information between that reconfiguration and the previously indicated configuration. The transmission of difference information is defined as delta configuration. For example, when the base station apparatus indicates reconfiguration, such as measured contents, to the reconnected mobile apparatus, the base station apparatus may transmit the difference information between configuration indicated before the reconnection and the reconfiguration. Between the pre-reconnection and the post-reconnection, the mobile apparatus inherits the configuration indicated before the reconnection. In other words, even if the reconnection occurs, the configuration held in the mobile apparatus remains unchanged.

See TS36.331 V9.1.0 2009 12 for further details, for example.

DISCLOSURE OF INVENTION

Problem to be Solved by the Invention

When a mobile apparatus presently activating the measurement gap requests reconnection to a base station apparatus, the mobile apparatus must deactivate the measurement gap. Accordingly, after the reconnection, the mobile apparatus would be in deactivation of the measurement gap. This is because the reconnected mobile apparatus inherits configuration indicated before the reconnection.

In general, it is assumed that the position of the mobile apparatus does not change substantially between the pre-reconnection and the post-reconnection. This is because temporary degradation of communication quality is a main factor of triggering the reconnection. Upon detecting degradation of the communication quality during activation of the measurement gap, the mobile apparatus deactivates the measurement gap and requests reconnection. As stated above, however, the position of the mobile apparatus does not change substantially after the reconnection, and it is accordingly assumed that the communication quality may be kept degraded. Upon detecting degradation of the communication quality, the base station apparatus indicates the mobile apparatus to activate the measurement gap to measure a predefined frequency band. Thus, upon detecting degradation of the communication quality, the mobile apparatus has to deactivate the measurement gap to conduct the reconnection. Even when the mobile apparatus has deactivated the measurement gap in this manner, the mobile apparatus would have to activate the measurement gap immediately.

Upon receiving an indication to activate the measurement gap from the base station apparatus, the mobile apparatus measures a frequency band different from a frequency band of the serving cell, a frequency band in a RAT different from the LTE or others and reports the measurements to the base station apparatus. The base station apparatus indicates a handover target based on the measurements. Although degradation of communication quality is expected, the mobile apparatus waits for the frequency band measurement until receiving an indication for activating the measurement gap. Accordingly, there is a risk that handover timings may be lost.

Accordingly, the present invention addresses the above-stated problems, and one object of the present invention is to provide a base station apparatus that can shorten a time period from a reconnection timing between a mobile apparatus and the base station apparatus to an activation timing of a frequency band measurement period by the mobile apparatus.

Means for Solving the Problem

One aspect of the present invention relates to a base station apparatus for wirelessly communicating to a mobile apparatus, including: a reconnection request signal receiving unit configured to receive a reconnection request signal transmitted from the mobile apparatus, the reconnection request signal being for the mobile apparatus requesting reconnection to the base station apparatus; a status detection unit configured to detect whether a status of the mobile apparatus immediately before transmitting the reconnection request signal corresponds to a status where a frequency band measurement period is activated, the frequency band measurement period causing the mobile apparatus to measure a frequency band different from a frequency band for a radio access technology for use in radio communication between the mobile apparatus and the base station apparatus; a response signal generation unit configured to generate a response signal to the reconnection request signal, the response signal generation unit generating, if the status detection unit determines that the frequency band measurement period is activated, the response signal including an indication signal for causing the mobile apparatus to activate the frequency band measurement period; and a response signal transmitting unit configured to transmit the generated response signal to the mobile apparatus.

Another aspect of the present invention relates to a method for a base station apparatus communicating to a mobile apparatus, including the steps of: receiving a reconnection request signal transmitted from the mobile apparatus, the reconnection request signal being for the mobile apparatus requesting reconnection to the base station apparatus; detecting whether a status of the mobile apparatus immediately before transmitting the reconnection request signal corresponds to a status where a frequency band measurement period is activated, the frequency band measurement period causing the mobile apparatus to measure a frequency band different from a frequency band for a radio access technology for use in radio communication between the mobile apparatus and the base station apparatus; generating a response signal to the reconnection request signal, the generating step comprising generating, if the detecting step determines that the frequency band measurement period is activated, the response signal including an indication signal for causing the mobile apparatus to activate the frequency band measurement period; and transmitting the generated response signal to the mobile apparatus.

Advantage of the Invention

According to the base station apparatus and the method as disclosed, the time period from a reconnection timing between a mobile apparatus and the base station apparatus to an activation timing of a frequency band measurement period by the mobile apparatus can be shortened.

BRIEF DESCRIPTION OF DRAWINGS

FIG. 3 is a schematic diagram for illustrating an operation of a base station apparatus according to the present embodiment;

FIG. 4 is a sequence diagram for illustrating an operation of a base station apparatus according to the present embodiment; and FIG. 5 is a sequence diagram for illustrating an exemplary operation of a base station apparatus.

EMBODIMENTS OF THE INVENTION

Embodiments of the present invention are described by way of examples as set forth with reference to the drawings. Throughout all the drawings for illustrating the embodiments, the same reference symbols are used for the same functions, and descriptions thereof are not repeated.

[Radio Communication System]

An environment to which a base station apparatus according to the present embodiment is applied is described.

A base station apparatus according to embodiments is applied to an environment having mixture of multiple mobile communication systems. The mobile communication systems include an Evolved UTRA and UTRAN based mobile communication system. The Evolved UTRA and UTRAN based mobile communication system is referred to as a Long Term Evolution (LTE). The mobile communication systems may further include a W-CDMA based mobile communication system.

A coverage area of the base station apparatus includes one or more cells. The cells include cells where radio communication is served at the same frequency band. Such cells available for radio communication at the same frequency band may be referred to as a frequency layer.

Figure 1:
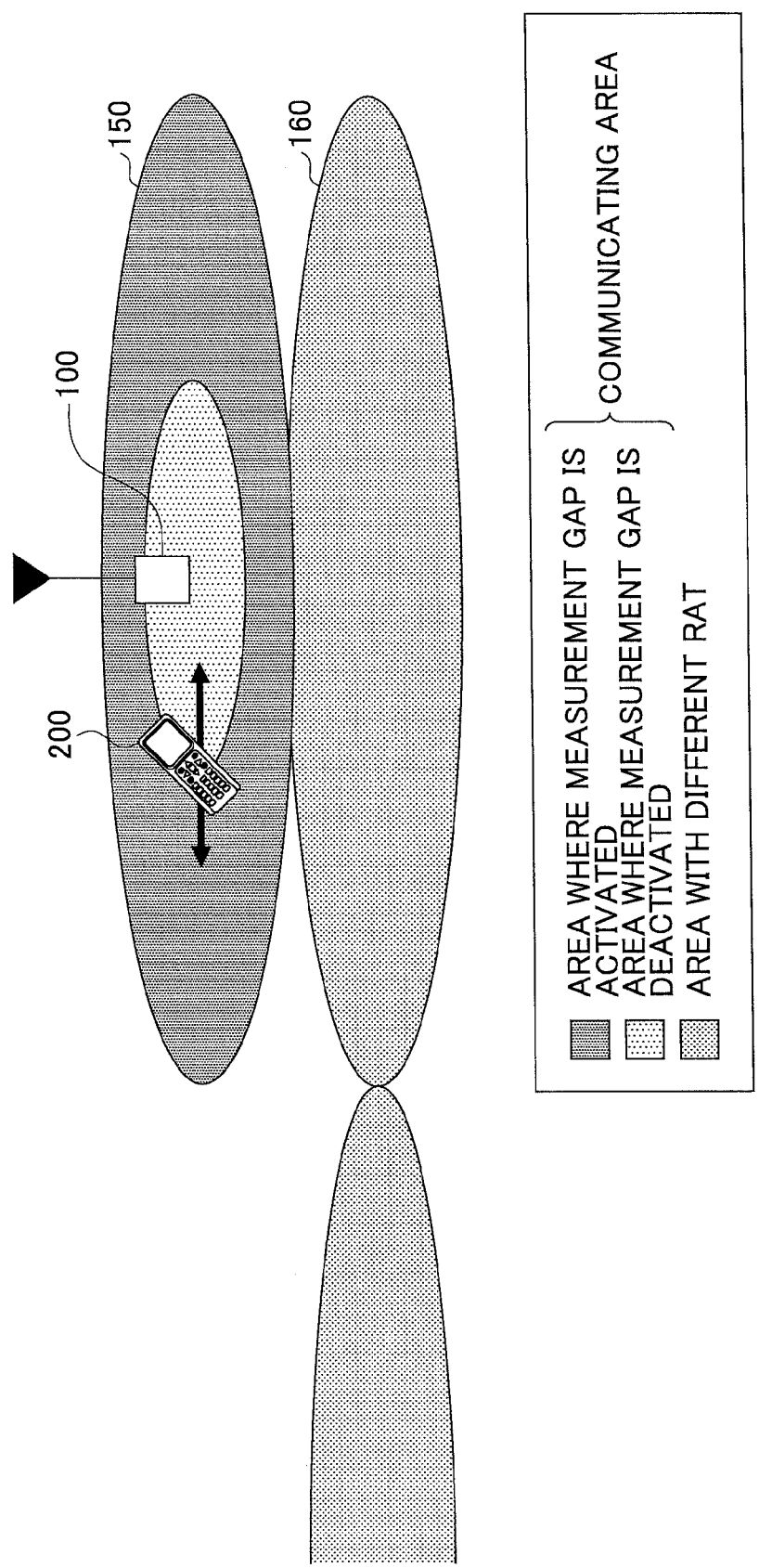
FIG. 1 is a schematic diagram for illustrating an environment to which a base station apparatus according to the present embodiment is applied.

FIG. 1 is a schematic diagram for illustrating an exemplary environment to which the base station apparatus is applied. In FIG. 1, by way of example, a base station apparatus 100 in compliance with the LTE scheme and a coverage area of the base station apparatus 100 are illustrated. This area includes a cell 150 where the base station apparatus 100 can wirelessly communicate to the mobile apparatus 200. The area may include a cell where the base station apparatus 100 can wirelessly communicate to the mobile apparatus 200 at a frequency band different from that for use in radio communication to the mobile apparatus 200. Also, the area may include a coverage cell of another base station apparatus (not shown) different from the base station apparatus 100. Also, the area may include a cell 160 where the base station apparatus 100 can wirelessly communicate to the mobile apparatus 200 in accordance with a RAT different from the LTE. The RAT may include the W-CDMA.

The cell 150 for use in radio communication to the mobile apparatus 200 includes an area where the base station apparatus 100 determines that the mobile apparatus 200 should be caused to activate a measurement gap (referred to as "measurement gap activation area" hereinafter) and an area where the base station apparatus 100 determines that the mobile apparatus 200 should be caused to deactivate the measurement gap (referred to as "measurement gap deactivation area" hereinafter) In other words, the "measurement gap activation area" is an area where it is more likely to degrade communication quality between the base station apparatus 100 and the mobile apparatus 200. The "measurement gap deactivation area" is an area where it is less likely to degrade the communication quality between the base station apparatus 100 and the mobile apparatus 200.

The base station apparatus 100 manages activation or deactivation of the measurement gap by the mobile apparatus 200. When the mobile apparatus 200 migrates to the measurement gap activation area, the base station apparatus 100 requests the mobile apparatus 200 to activate the measurement gap. The determination as to whether the measurement gap is to be activated may be based on the communication quality of the base station apparatus 100 and the mobile apparatus 200.

Also, when the mobile apparatus 200 migrates to the measurement gap deactivation area, the base station apparatus 100 requests the mobile apparatus 200 to deactivate the measurement gap. The determination as to whether the measurement gap is to be deactivated may be based on the communication quality between the base station apparatus 100 and the mobile apparatus 200.

Upon receiving a "reconnection request signal" from the mobile apparatus 200, the base station apparatus 100 transmits a "reconnection request response signal" to the mobile apparatus 200. When transmitting the "reconnection request response signal", the base station apparatus 100 determines whether the mobile apparatus 200 has activated the measurement gap at the transmission timing of the "reconnection request signal". The base station apparatus 100 is able to comprehend the status of the mobile apparatus 200 immediately before the mobile apparatus 200 transmits the "reconnection request signal". This is because the activation or deactivation of the measurement gap is indicated by the base station apparatus 100. If it is determined that the measurement gap has been activated, the base station apparatus 100 includes an indication signal for activating the measurement gap in a "line configuration and measurement indication signal" that is to be transmitted after receipt of a "reconnection report signal" from the mobile apparatus 200. The "line configuration and measurement indication signal" includes line configuration information for configuring lines and frequency band measurement information for measuring frequency bands.

Upon receiving the "line configuration and measurement indication signal" including the signal for causing the mobile apparatus 200 to activate the measurement gap, the mobile apparatus 200 activates the measurement gap.

The inclusion of the signal for causing the mobile apparatus 200 to activate the measurement gap in the "line configuration and measurement indication signal" can shorten a time period from a reconnection timing between the base station apparatus 100 and the mobile apparatus 200 to an activation timing of the measurement gap by the mobile apparatus 200. In other words, the "reconnection request signal" from the mobile apparatus 200 presently activating the measurement gap can eliminate some procedures from transmission of the "line configuration and measurement indication signal" from the base station apparatus 100 to transmission of the signal for causing the mobile apparatus 200 to activate the measurement gap in response to detection of degradation of the communication quality between the base station apparatus 100 and the mobile apparatus 200. Since the procedures from transmission of the "line configuration and measurement indication signal" from the base station apparatus 100 to transmission of the signal for causing the mobile apparatus 200 to activate the measurement gap in response to detection of degradation of the communication quality between the base station apparatus 100 and the mobile apparatus 200 become unnecessary, the timing for causing the mobile apparatus 200 to measure a frequency band different from that in a RAT for use in radio communication to the base station apparatus 100 and/or a frequency band in a RAT different from that RAT can be advanced. Since the timing for causing the mobile apparatus 200 to measure the frequency band can be advanced, it is possible to reduce the likelihood that handover triggers may be lost. Also, no indication for changing measurement contents at reconnection is needed.

The mobile apparatus according to the present embodiment can conduct radio communication in accordance with the LTE scheme. In addition, the mobile apparatus may be able to conduct radio communication in accordance with a RAT different from the LTE scheme. The different RAT may include the W-CDMA.

[Base Station Apparatus]

The base station apparatus 100 is connected to a Mobility Management Entity/Serving Gateway (MME/SGW). The MME/SGW is connected to a core network (not shown). The base station apparatus 100 covers the cell 150. The mobile apparatus 200 communicates with the base station apparatus 100 in the cell 150 in accordance with the Evolved UTRA and UTRAN scheme. The MME/SGW may be referred to as an access gateway. The base station apparatus 100 may be connected to an Evolved Packet Core (EPC) (not shown).

The MME/SGW may be connected to a single base station apparatus or multiple base station apparatuses.

Figure 2:
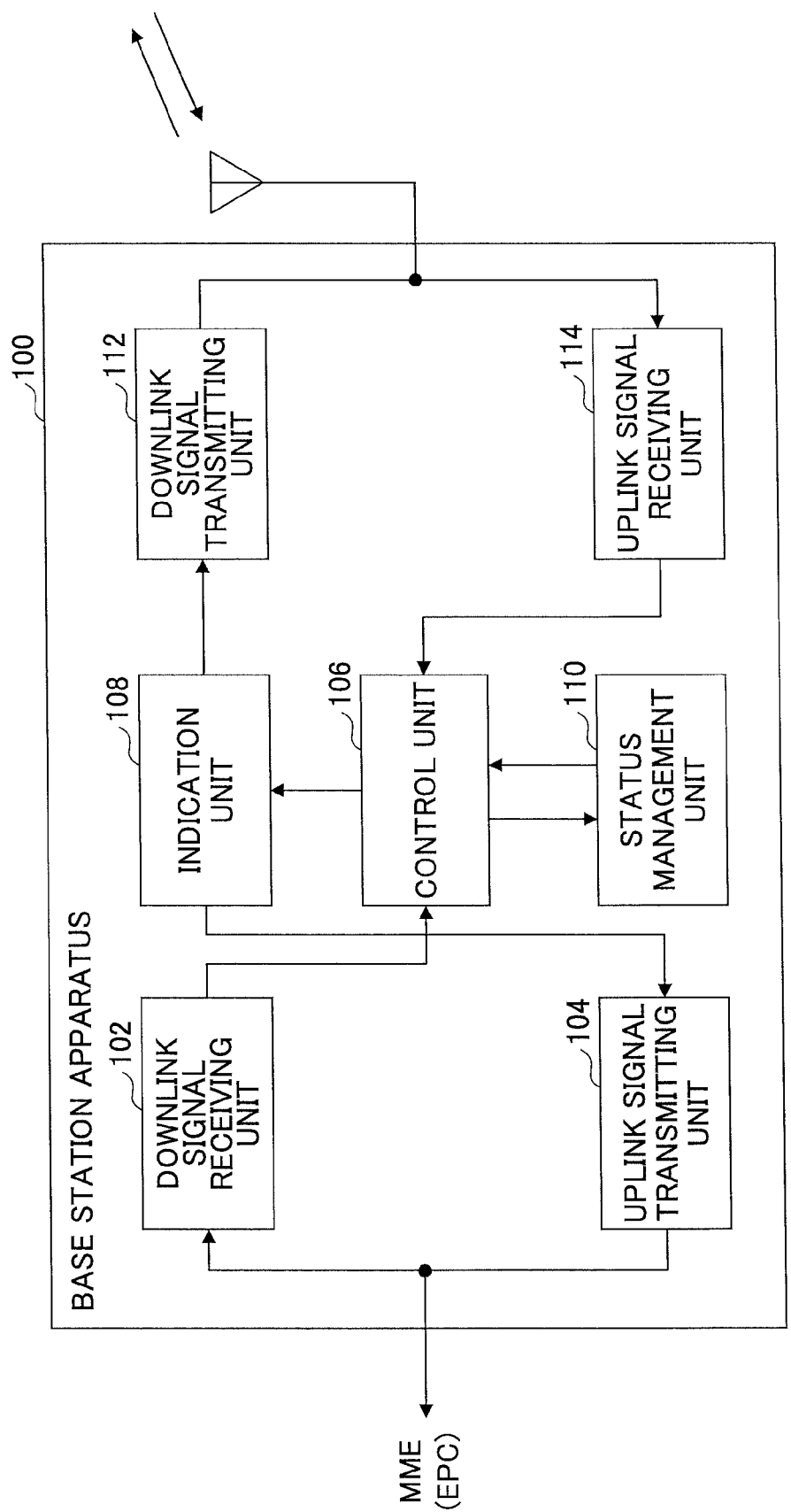
FIG. 2 is a functional block diagram for illustrating a base station apparatus according to the present embodiment.

FIG. 2 illustrates the base station apparatus 100 according to the present embodiment. As illustrated in FIG. 2, the base station apparatus 100 includes a downlink signal receiving unit 102, an uplink signal transmitting unit 104, a control unit 106, an indication unit 108, a status management unit 110, a downlink signal transmitting unit 112 and an uplink signal receiving unit 114.

The downlink signal receiving unit 102 receives a downlink signal transmitted from an upper apparatus such as a MME. The downlink signal includes a downlink signal transmitted from other mobile apparatuses and received from a base station apparatus communicating with the other mobile station apparatuses via the MME. The downlink signal may be transmitted from a MME different from the MME connecting to the base station apparatus 100 to that MME. The downlink signal receiving unit 102 supplies the received downlink signal to the control unit 106.

The uplink signal receiving unit 114 receives a radio signal transmitted from the mobile apparatus 200. The radio signal includes an uplink signal transmitted from the mobile apparatus 200 and destined for other mobile apparatuses. The radio signal includes a "reconnection request signal" transmitted upon the mobile apparatus 200 presently activating measurement gap detects degradation of communication quality. Also, the radio signal includes a "reconnection report signal" transmitted by the mobile apparatus 200 for reply to a "reconnection request response signal" received from the base station apparatus. Also, the radio signal includes a "line configuration and measurement indication response signal" transmitted by the mobile apparatus 200 upon activation of a measurement gap based on a "line configuration and measurement indication signal" received from the base station apparatus 100. The "line configuration and measurement indication signal" includes an indication signal for causing the mobile apparatus 200 to activate the measurement gap. Also, the radio signal includes a "handover request signal" for the mobile apparatus 200 to report measurements for a frequency band selected in accordance with an indication from the base station apparatus 100 from frequency bands available for radio communication in accordance with the LTE scheme. The selected frequency band may be different from the presently communicating frequency band and/or a frequency band for use in a RAT different from the LTE scheme. Also, the uplink signal receiving unit 114 measures reception quality of a radio signal transmitted from the mobile apparatus 200. The uplink signal receiving unit 114 supplies the received signal and the reception quality to the control unit 106.

The status management unit 110 is connected to the control unit 106. The status management unit 110 manages the status of the mobile apparatus 200 allowed to wirelessly communicate to the base station apparatus 100. The status of the mobile apparatus 200 includes a measurement gap activation status and a measurement gap deactivation status.

The control unit 106 is connected to the downlink signal receiving unit 102, the uplink signal receiving unit 114, the indication unit 108 and the status management unit 110. The control unit 106 indicates the indication unit 108 to supply a downlink signal received from the downlink signal receiving unit 102 to a destination mobile apparatus. The control unit 106 indicates the indication unit 108 to transmit an uplink signal supplied from the uplink signal receiving unit 114 to a destination mobile apparatus. The control unit 106 performs a reconnection operation based on the "reconnection request signal" supplied from the uplink signal receiving unit 114. Upon performing the reconnection operation, the control unit 106 indicates the indication unit 108 to transmit a "reconnection request response signal". Also, the control unit 106 completes the reconnection operation based on the "reconnection report signal" supplied from the uplink signal receiving unit 114. Also, after the control unit 106 transmits the "reconnection request response signal" to the mobile apparatus 200, the mobile apparatus 200 determines the status of the mobile apparatus 200 at transmission timing of the "reconnection request signal". That status includes a measurement gap activation status and a measurement gap deactivation status. The control unit 106 obtains status information recorded in the status management unit 110 and determines based on the status information whether to cause the mobile apparatus 200 to activate the measurement gap immediately after the reconnection operation between the mobile apparatus 200 requesting the reconnection and the base station apparatus 100. For example, if the control unit 106 determines that the mobile apparatus 200 has activated the measurement gap at the transmission timing of the "reconnection request signal", the control unit 106 determines to cause the mobile apparatus 200 to activate the measurement gap immediately after the reconnection operation. On the other hand, if the control unit 106 determines that the mobile apparatus 200 has deactivated the measurement gap at the transmission timing of the "reconnection request response signal", the control unit 106 does not determine to cause the mobile apparatus 200 to activate the measurement gap immediately after the reconnection operation.

In the case where the control unit 106 determines that the mobile apparatus 200 is to be caused to activate the measurement gap immediately after the reconnection operation, the control unit 106 indicates the indication unit 108 to transmit the "line configuration and measurement indication signal" including an indication signal for causing the mobile apparatus 200 to activate the measurement gap. In the other case where the control unit 106 determines that the mobile apparatus 200 is not to be caused to activate the measurement gap immediately after the reconnection operation, the control unit 106 indicates the indication unit 108 to transmit the "line configuration and measurement indication signal" without including the indication signal for causing the mobile apparatus 200 to activate the measurement gap.

Also, after transmitting the "line configuration and measurement indication signal", upon an incoming "line configuration and measurement indication response signal" from the mobile apparatus 200, the control unit 106 completes activation of the measurement gap.

After transmitting the "line configuration and measurement indication response signal", the mobile apparatus 200 measures a frequency band different from the presently connected frequency band in a RAT for use in radio communication and/or a frequency band for a different RAT. The mobile apparatus 200 transmits a handover request signal including measurements of the frequency band to the base station apparatus 100. The handover request signal including the measurements of the frequency band is supplied from the uplink signal receiving unit 114 to the control unit 106. The control unit 106 determines whether to cause the mobile apparatus 200 to initiate handover based on the measurements of the frequency band. If the mobile apparatus is caused to initiate the handover, the control unit 106 indicates the indication unit 108 to transmit a handover indication to the mobile apparatus 200.

The indication unit 108 is connected to the control unit 106, the downlink signal transmitting unit 112 and the uplink signal transmitting unit 104.

The indication unit 108 issues an indication to transmit an uplink signal in accordance with an indication from the control unit 106. For example, the indication unit 108 may indicate the uplink signal transmitting unit 104 to transmit an uplink signal from the uplink signal receiving unit 114 to a MME in accordance with the indication by the control unit 106.

Also, the indication unit 108 issues an indication to transmit a downlink signal in accordance with an indication from the control unit 106. For example, the indication unit 108 may indicate the downlink signal transmitting unit 112 to transmit a downlink signal from the downlink signal receiving unit 102 to the mobile apparatus 200 in accordance with the indication from the control unit 106.

Also, the indication unit 108 issues an indication to transmit a downlink signal in accordance with an indication from the control unit 106. For example, the indication unit 108 may indicate the downlink signal transmitting unit 112 to transmit a "reconnection request response signal" and a "line configuration and measurement indication signal" to the mobile apparatus 200 in accordance with the indication from the control unit 106.

The uplink signal transmitting unit 104 is connected to the indication unit 108. The uplink signal transmitting unit 104 transmits an uplink signal in accordance with an indication from the indication unit 108.

The downlink signal transmitting unit 112 is connected to the indication unit 108. The downlink signal transmitting unit 112 transmits a downlink signal in accordance with an indication from the indication unit 108.

[Operation of the Base Station Apparatus]

FIG. 3 is a diagram for illustrating an operation of the base station apparatus. In this embodiment, exemplary cases are described below. After transition to an active status, the mobile apparatus 200 migrates from a measurement gap deactivation area to a boundary point (point A) between the measurement gap deactivation area and a measurement gap activation area. After migration to the point A, the mobile apparatus 200 migrates to the measurement gap activation area. After migration to the measurement gap activation area, the mobile apparatus 200 migrates to a boundary point (point B) between the measurement gap activation area and the measurement gap deactivation area. After migration to the point B, the mobile apparatus 200 migrates to the measurement gap deactivation area.

FIG. 4 is a sequence diagram for illustrating an operation between the base station apparatus and the mobile apparatus.

The mobile apparatus 200, located in the measurement gap deactivation area, transmits a "connection request signal" for requesting connection to the base station apparatus 100 (step S402). The "connection request signal" may be also referred to as a "RRC Connection Request".

Upon receiving the "connection request signal" from the mobile apparatus 200, the base station apparatus 100 transmits a "connection setup signal" (step S404). The "connection setup signal" may be also referred to as a "RRC Connection Setup".

Upon receiving the "connection setup signal" from the base station apparatus 100, the mobile apparatus 200 transmits a "connection setup report signal" for reporting completion of the connection setup to the base station apparatus 100 (step S406). The "connection setup report signal" may be also referred to as a "RRC Connection Setup Complete".

Upon receiving the "connection setup report signal" from the mobile apparatus 200, the base station apparatus 100 transmits a "security mode command" for setting a security mode (step S408).

When transmitting the "security mode command" to the mobile apparatus 200, the base station apparatus 100 transmits a "line configuration and measurement indication signal" for configuring a line and indicating frequency band measurement to the mobile apparatus 200 (step S410). The "line configuration and measurement indication signal" may include intra-frequency configuration information. The intra-frequency configuration information corresponds to information configured to measure the communicating frequency band in frequency bands available for radio communication in accordance with the LTE scheme. Also, the "line configuration and measurement indication signal" may include information configured to activate the measurement gap.

Upon receiving the "security mode command" from the base station apparatus 100, the mobile apparatus 200 transmits a "security mode setup report signal" for setting the security mode and reporting setup completion of the security mode (step S412). The "security mode setup report signal" may be also referred to as a "Security Mode Complete".

Upon receiving the "line configuration and measurement indication signal" from the base station apparatus 100, the mobile apparatus 200 sets the line and configurations in accordance with the configurations in the "line configuration and measurement indication signal". Then, the mobile apparatus 200 transmits a "line configuration and measurement indication response signal" for reporting setup completion (step S414). The "line configuration and measurement indication response signal" may be also referred to as a "RRC Connection Reconfiguration Complete".

Through steps S402-S414, the mobile apparatus 200 can transition to the active mode.

When migrating to the point A, the mobile apparatus 200 performs frequency band measurement in accordance with configurations in transmission of the "line configuration and measurement indication response signal at step S414 and transmits a "measurement report signal" including the frequency band measurements (step S416). The "measurement report signal" may be also referred to as a "Measurement Report".

Upon receiving the "measurement report signal", the base station apparatus 100 determines that the communication quality has been degraded based on the frequency band measurement in the "measurement report signal". The base station apparatus 100 determines that there is a likelihood that the mobile apparatus 200 may be caused to conduct handover. The base station apparatus 100 transmits a "line configuration and measurement indication signal" for indicating the mobile apparatus 200 to configure the line and perform the frequency band measurement (step S418). The "line configuration and measurement indication signal" includes an indication for causing the mobile apparatus 200 to activate the measurement gap. The "line configuration and measurement indication signal" includes information to remove information configured to activate the measurement gap. This is because it includes the indication for causing the mobile apparatus 200 to activate the measurement gap. The "line configuration and measurement indication signal" includes information configured to deactivate the measurement gap. The "line configuration and measurement indication signal" may include inter-frequency configuration information. The inter-frequency configuration information is configured to measure a frequency band different from the communicating frequency band in frequency bands available for radio communication in accordance with the LTE scheme. The "line configuration and measurement indication signal" includes information configured to measure a frequency band for use in a RAT different from the LTE scheme.

Upon receiving the "line configuration and measurement indication signal" from the base station apparatus 100, the mobile apparatus 200 sets a line and configurations in accordance with configurations in the "line configuration and measurement indication signal" received at step S418. Then, the mobile apparatus 200 transmits a "line configuration and measurement indication response signal" for reporting setup completion (step S420). The "line configuration and measurement indication response signal" may be also referred to as a "RRC Connection Reconfiguration Complete".

Independent of activation of the measurement gap, the mobile apparatus 200 measures the communicating frequency band in the frequency bands available for radio communication in accordance with the LTE scheme. The mobile apparatus 200 activates the measurement gap and measures a frequency band different from the communicating frequency band in the frequency band available for radio communication in accordance with the LTE scheme as well as a frequency band for use in a RAT different from the LTE scheme.

However, the mobile apparatus 200, locating in the measurement gap activation area, detects degradation of the communication quality during activation of the measurement gap and transmits a "reconnection request signal" for requesting reconnection to the base station apparatus 100 (step S422). The "reconnection request signal" may be also referred to as a "RRC Connection Re-establishment Request".

Upon receiving the "reconnection request signal", the base station apparatus 100 transmits a "reconnection request response signal" to the mobile apparatus 200 (step S424). For example, the "reconnection request signal" may be received at the uplink signal receiving unit 114 and supplied to the control unit 106. When performing reconnection operation, the control unit 106 indicates the indication unit 108 to transmit the "reconnection request response signal". The indication unit 108 indicates the downlink signal transmitting unit 112 to transmit the "reconnection request response signal" to the mobile apparatus 200 in accordance with an indication from the control unit 106. The downlink signal transmitting unit 112 transmits the "reconnection request response signal" in accordance with an indication from the indication unit 108. The "reconnection request response signal" may be also referred to as an "RRC Connection Re-establishment".

Upon receiving the "reconnection request response signal" from the base station apparatus 100, the mobile apparatus 200 transmits the "reconnection request response signal" (step S426). The "reconnection request response signal" may be also referred to as an "RRC Connection Re-establishment Complete".

Upon receiving the "reconnection request response signal" from the mobile apparatus 200, the base station apparatus 100 transmits a "line configuration and measurement indication signal" to cause the mobile apparatus 200 to configure a line and measure a frequency band to the mobile apparatus 200 (step S428). The "line configuration and measurement indication signal" includes an indication signal for causing the mobile apparatus 200 to activate the measurement gap. For example, the "reconnection request response signal" may be received at the uplink signal receiving unit 114 and supplied to the control unit 106. The control unit 106 comprehends the status of the mobile apparatus 200 immediately before the mobile apparatus 200 transmitting the "reconnection request response signal" transmits a "reconnection request signal". If the control unit 106 determines that the status of the mobile apparatus 200 immediately before transmitting the "reconnection request signal" corresponds to a measurement gap activation status, the control unit 106 indicates the indication unit 108 to transmit the "line configuration and measurement indication signal" including an indication signal for causing the mobile apparatus 200 to activate the measurement gap. On the other hand, if the control unit 106 determines that the status of the mobile apparatus 200 immediately before transmitting the "reconnection request signal" corresponds to a measurement gap deactivation status, the control unit 106 indicates the indication unit 108 to transmit the "line configuration and measurement indication signal" without including the indication signal for causing the mobile apparatus 200 to activate the measurement gap. The indication unit 108 indicates the downlink signal transmitting unit 112 to transmit the "line configuration and measurement indication signal" in accordance with an indication from the control unit 106. The downlink signal transmitting unit 112 transmits the "line configuration and measurement indication signal" in accordance with an indication from the indication unit 108. The "line configuration and measurement indication signal" may be also referred to as an "RRC Connection Reconfiguration".

Upon receiving the "line configuration and measurement indication signal" from the base station apparatus 100, the mobile apparatus 200 sets a line and configurations. The configurations are the same as those of step S418. Since the configurations are the same as those of step S418, the "line configuration and measurement indication signal" of step S428 does not include similar configurations. Specifically, the mobile apparatus 200 configures contents for use in activation of the measurement gap. Also, the mobile apparatus 200 configures contents for use in removal of information configured to activate the measurement gap. Also, the mobile apparatus 200 configures contents for use in activation of the measurement gap. Also, the mobile apparatus 200 configures contents for use in setup for deactivation of the measurement gap. Also, the mobile apparatus 200 configures inter-frequency configuration information. The inter-frequency configuration information corresponds to information configured to measure a frequency band different from the communicating frequency band in frequency bands available for radio communication in accordance with the LTE scheme. Also, the mobile apparatus 200 configures information configured to measure a frequency band for use in a RAT different from the LTE scheme.

The mobile apparatus 200 transmits a "line configuration and measurement indication response signal" for indicating configuration completion (step S430). The "line configuration and measurement indication response signal" may be also referred to as an "RRC Connection Reconfiguration Complete".

The mobile apparatus 200 measures the frequency band and transmits a "measurement report signal" including the frequency band measurements (step S432). The "measurement report signal" may be also referred to as a "Measurement Report".

Upon receiving the "measurement report signal", the base station apparatus 100 determines whether to cause the mobile apparatus 200 to conduct handover based on the frequency band measurements in the "measurement report signal". If the base station apparatus 100 determines that the mobile apparatus 200 should be caused to conduct the handover, the handover procedure is performed between the base station apparatus 100 and the mobile apparatus 200 (step S434).

FIG. 5 is a sequence diagram for illustrating an exemplary operation between a conventional base station apparatus and a mobile apparatus.

In FIG. 5, steps S502-S506 correspond to steps S422-S426.

After receiving a "reconnection request response signal" from the mobile apparatus, the conventional base station apparatus transmits a "line configuration and measurement indication signal" for causing the mobile apparatus to configure a line and measure a frequency band (step S508). The "line configuration and measurement indication signal" may include an indication signal for causing the mobile apparatus to deactivate the measurement gap. This is because the mobile apparatus is caused to transition to the status immediately before transmitting the reconnection request signal. Also, the "line configuration and measurement indication signal" includes information configured to cause the mobile apparatus to bring contents measured during the measurement gap activation to a halt and activate the measurement gap.

Upon receiving the "line configuration and measurement indication signal" from the base station apparatus, the mobile apparatus configures a line and measured contents in accordance with configurations in the "line configuration and measurement indication signal" received at step S508. The mobile apparatus transmits a "line configuration and measurement indication response signal" for reporting configuration completion (step S510). The "line configuration and measurement indication response signal" may be also referred to as an "RCC Connection Reconfiguration Complete".

The mobile apparatus performs frequency band measurement and transmits a "measurement report signal" including the frequency band measurements (step S512). The "measurement report signal" may be also referred to as a "Measurement Report".

Upon receiving the "measurement report signal", the base station apparatus determines that the communication quality has been degraded based on the frequency band measurements in the "measurement report signal". The base station apparatus determines that there is a likelihood that the mobile apparatus may be caused to conduct handover. The base station apparatus transmits a "line configuration and measurement indication signal" for causing the mobile apparatus to configure a line and measure a frequency band (step S514). The "line configuration and measurement indication signal" includes an indication signal for causing the mobile apparatus to activate the measurement gap. The "line configuration and measurement indication signal" includes information configured to deactivate the measurement gap. The "line configuration and measurement indication signal" may be also referred to as an "RRC Connection Reconfiguration".

Upon receiving the "line configuration and measurement indication signal" from the base station apparatus, the mobile apparatus configures a line and measured contents in accordance with the "line configuration and measurement indication signal" received at step S514. Then, the mobile apparatus transmits a "line configuration and measurement indication response signal" for reporting configuration completion (step S516). The "line configuration and measurement indication response signal" may be also referred to as an "RRC Connection Reconfiguration Complete".

The mobile apparatus activates the measurement gap and measures a frequency band different from the communicating frequency band in frequency bands available for radio communication in accordance with the LTE scheme as well as a frequency band for use in a RAT different from the LTE scheme.

The mobile apparatus transmits a "measurement report signal" including the frequency band measurements (step S518). The "measurement report signal" may be also referred to as a "Measurement Report".

Upon receiving the "measurement report signal", the base station apparatus determines whether to cause the mobile apparatus to conduct handover based on the frequency band measurements in the "measurement report signal". If the base station apparatus determines that the mobile apparatus should be caused to conduct the handover, the handover procedure is performed between the base station apparatus and the mobile apparatus (step S520).

According to the present embodiment, the indication signal for causing the mobile apparatus to activate the measurement gap is included in the "line configuration and measurement indication signal" transmitted at step S428, and accordingly the mobile apparatus can activate the measurement gap immediately after completion of reconnection. In the conventional sequence as illustrated in FIG. 5, the indication signal for causing the mobile apparatus to activate the measurement gap is not included in the "line configuration and measurement indication signal" transmitted at step S508, and accordingly when it is determined that reception quality has been degraded, the indication signal for causing the mobile apparatus to activate the measurement gap is transmitted based on the measurement report transmitted at step S512 from the mobile apparatus (step S514). After transmission of the indication signal for causing the mobile apparatus to activate the measurement gap as well as transmission of the "line configuration and measurement indication response signal" from the mobile apparatus (step S516), the mobile apparatus activates the measurement gap and measures a frequency band.

In other words, according to the present embodiment, steps S512-S516 do not have to be performed, which can shorten the processing time. Due to the shorted processing time, the likelihood of delaying handover timings can be reduced.

According to one aspect of the present invention, a base station apparatus for wirelessly communicating to a mobile apparatus is provided. A base station apparatus according to one aspect of the present invention includes:
 a reconnection request signal receiving unit configured to receive a reconnection request signal transmitted from the mobile apparatus, the reconnection request signal being for the mobile apparatus requesting reconnection to the base station apparatus;
 a status detection unit configured to detect whether a status of the mobile apparatus immediately before transmitting the reconnection request signal corresponds to a status where a frequency band measurement period is activated, the frequency band measurement period causing the mobile apparatus to measure a frequency band different from a frequency band for a radio access technology for use in radio communication between the mobile apparatus and the base station apparatus;
 a response signal generation unit configured to generate a response signal to the reconnection request signal, the response signal generation unit generating, if the status detection unit determines that the frequency band measurement period is activated, the response signal including an indication signal for causing the mobile apparatus to activate the frequency band measurement period; and
 a response signal transmitting unit configured to transmit the generated response signal to the mobile apparatus.

According to the above-stated base station apparatus, if it is determined that the status of the mobile apparatus immediately before transmitting the reconnection request signal corresponds to the status where the frequency band measurement period is presently activated, the response signal including the indication signal for causing the mobile apparatus to activate the frequency band measurement period is transmitted, which can shorten the time period from the reconnection timing between the base station apparatus and the mobile apparatus to the activation timing of the frequency band measurement period.

In one embodiment, the status detection unit may detect whether the status of the mobile apparatus immediately before transmitting the reconnection request signal corresponds to a status where the frequency band measurement period is activated, the frequency band measurement period causing the mobile apparatus to measure a different frequency band in a radio access technology for use in the radio communication between the mobile apparatus and the base station apparatus and/or a frequency band available for a radio access technology different from the radio access technology for use in the radio communication between the mobile apparatus and the base station apparatus.

According to the above embodiment, the handover can be performed based on a frequency band in a RAT for use in radio communication to the base station apparatus and/or a frequency band available for a RAT different from the present. RAT.

In one embodiment, the response signal may be for indicating line configuration and frequency measurement to the mobile apparatus.

According to the above embodiment, the base station apparatus can indicate the mobile apparatus to activate frequency band measurement by using an indication signal for indicating line configuration and frequency band measurement transmitted for reconnection operations between the base station apparatus and the mobile apparatus.

According to one aspect of the present invention, a method for a base station apparatus communicating to a mobile apparatus is provided. A method according to one aspect of the present invention includes the steps of:
 receiving a reconnection request signal transmitted from the mobile apparatus, the reconnection request signal being for the mobile apparatus requesting reconnection to the base station apparatus;
 detecting whether a status of the mobile apparatus immediately before transmitting the reconnection request signal corresponds to a status where a frequency band measurement period is activated, the frequency band measurement period causing the mobile apparatus to measure a frequency band different from a frequency band for a radio access technology for use in radio communication between the mobile apparatus and the base station apparatus;
 generating a response signal to the reconnection request signal, the generating step comprising generating, if the detecting step determines that the frequency band measurement period is activated, the response signal including an indication signal for causing the mobile apparatus to activate the frequency band measurement period; and
 transmitting the generated response signal to the mobile apparatus.

In one embodiment, the detecting step may detect whether the status of the mobile apparatus immediately before transmitting the reconnection request signal corresponds to a status where the frequency band measurement period is activated, the frequency band measurement period causing the mobile apparatus to measure a different frequency band in a radio access technology for use in the radio communication between the mobile apparatus and the base station apparatus and/or a frequency band available for a radio access technology different from the radio access technology for use in the radio communication between the mobile apparatus and the base station apparatus.

In one embodiment, the response signal may be for indicating line configuration and frequency measurement to the mobile apparatus.

For convenience of explanation, specific numerals are used to facilitate understandings of the present invention. However, unless specifically stated otherwise, these specific numerals are illustratively used, and any other appropriate values may be used.

The present invention has been described with reference to specific embodiments, but the embodiments are illustrative, and variations, modifications, alterations and substitutions could be conceived by those skilled in the art. For convenience of explanation, apparatuses according to embodiments of the present invention have been described by means of functional block diagrams, but the apparatuses may be implemented in hardware, software or combinations thereof. The present invention is not limited to the above embodiment and various variations, modifications, alterations and substitutions can be included in the present invention without deviation from the spirit of the present invention.

This international patent application is based on Japanese Priority Application No. 2010-087105 filed on Apr. 5, 2010, the entire contents of which are hereby incorporated by reference.

LIST OF REFERENCE SYMBOLS

100: base station apparatus
102: downlink signal receiving unit
104: uplink signal transmitting unit
106: control unit
108: indication unit
110: status management unit
112: downlink signal transmitting unit
114: uplink signal receiving unit
150: cell
160: cell

The invention claimed is:

1. A base station apparatus for wirelessly communicating to a mobile apparatus, comprising:
an uplink signal receiving unit configured to receive a reconnection request signal transmitted from the mobile apparatus, the reconnection request signal being for the mobile apparatus requesting reconnection to the base station apparatus;
a status management unit configured to detect whether a status of the mobile apparatus immediately before transmitting the reconnection request signal corresponds to a status where a frequency band measurement period is activated, the frequency band measurement period causing the mobile apparatus to measure a frequency band different from a frequency band for a radio access technology for use in radio communication between the mobile apparatus and the base station apparatus;
a control unit configured to generate a response signal to the reconnection request signal, the control unit generating, if the status management unit determines that the frequency band measurement period is activated, the response signal including an indication signal for causing the mobile apparatus to activate the frequency band measurement period; and
a downlink signal transmitting unit configured to transmit the generated response signal to the mobile apparatus.

2. The base station apparatus as claimed in claim 1, wherein the status management unit detects whether the status of the mobile apparatus immediately before transmitting the reconnection request signal corresponds to a status where the frequency band measurement period is activated, the frequency band measurement period causing the mobile apparatus to measure a different frequency band in a radio access technology for use in the radio communication between the mobile apparatus and the base station apparatus and/or a frequency band available for a radio access technology different from the radio access technology for use in the radio communication between the mobile apparatus and the base station apparatus.

3. The base station apparatus as claimed in claim 1, wherein the response signal is for indicating line configuration and frequency measurement to the mobile apparatus.

4. A method for a base station apparatus communicating to a mobile apparatus, comprising the steps of:
receiving a reconnection request signal transmitted from the mobile apparatus, the reconnection request signal being for the mobile apparatus requesting reconnection to the base station apparatus;
detecting whether a status of the mobile apparatus immediately before transmitting the reconnection request signal corresponds to a status where a frequency band measurement period is activated, the frequency band measurement period causing the mobile apparatus to measure a frequency band different from a frequency band for a radio access technology for use in radio communication between the mobile apparatus and the base station apparatus;
generating a response signal to the reconnection request signal, the generating step comprising generating, if the detecting step determines that the frequency band measurement period is activated, the response signal including an indication signal for causing the mobile apparatus to activate the frequency band measurement period; and
transmitting the generated response signal to the mobile apparatus.

5. The method as claimed in claim 4, wherein the detecting step comprises detecting whether the status of the mobile apparatus immediately before transmitting the reconnection request signal corresponds to a status where the frequency band measurement period is activated, the frequency band measurement period causing the mobile apparatus to measure a different frequency band in a radio access technology for use in the radio communication between the mobile apparatus and the base station apparatus and/or a frequency band available for a radio access technology different from the radio access technology for use in the radio communication between the mobile apparatus and the base station apparatus.

6. The method as claimed in claim 4, wherein the response signal is for indicating line configuration and frequency measurement to the mobile apparatus.

7. The base station apparatus as claimed in claim 2, wherein the response signal is for indicating line configuration and frequency measurement to the mobile apparatus.

8. The method as claimed in claim 5, wherein the response signal is for indicating line configuration and frequency measurement to the mobile apparatus.

* * * * *